US008059398B2

(12) United States Patent
Chang (10) Patent No.: US 8,059,398 B2
(45) Date of Patent: Nov. 15, 2011

(54) PANEL MODULE FOR A COMPUTER ENCLOSURE, AND THE COMPUTER ENCLOSURE

(75) Inventor: Chao-Wen Chang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 179 days.

(21) Appl. No.: 12/343,781

(22) Filed: Dec. 24, 2008

(65) Prior Publication Data

US 2009/0284916 A1 Nov. 19, 2009

(30) Foreign Application Priority Data

May 15, 2008 (TW) .............................. 97117838 A (51) Int. Cl.
*H05K 7/16* (2006.01)
(52) U.S. Cl. ............ 361/679.58; 361/679.02; 312/223.2
(58) Field of Classification Search ............. 361/679.02, 361/679.01, 679.58, 679.37; 312/223.1–223.2
See application file for complete search history.

(56) References Cited

U.S. PATENT DOCUMENTS

| | | | | |
|---|---|---|---|---|
| 5,926,916 A * | 7/1999 | Lee et al. ........................ | 16/230 |
| 6,062,663 A * | 5/2000 | You et al. ..................... | 312/223.2 |
| 6,134,116 A * | 10/2000 | Hoss et al. ..................... | 361/747 |
| 6,903,933 B2 | 6/2005 | Wang | |
| 6,954,354 B2 * | 10/2005 | Shyr ......................... | 361/679.33 |
| 7,431,408 B2 * | 10/2008 | Lai ............................... | 312/223.1 |
| 7,679,897 B2 * | 3/2010 | Xu et al. .................. | 361/679.37 |
| 2002/0109966 A1 * | 8/2002 | Crowley ....................... | 361/683 |
| 2008/0151508 A1 * | 6/2008 | Chen et al. .................... | 361/724 |

* cited by examiner

Primary Examiner — Jinhee Lee
Assistant Examiner — Ingrid Wright
(74) Attorney, Agent, or Firm — Grossman Tucker Perreault & Pfleger PLLC (57) ABSTRACT

A panel module for a computer enclosure includes a main panel, a linkage member, a cover panel, and a resilient limiting member. The main panel has a cover region and an opening provided in the cover region. The linkage member is connected pivotally to the main and cover panels. The cover panel is movable relative to the main panel to be closed upon or flipped away from the cover region. The linkage member is disposed at a closed position when the cover panel is closed. The limiting member is interposed between the main panel and the linkage member to limit the linkage member to the closed position, and enables the linkage member to be automatically restored to the closed position when the cover panel is to be closed, thereby permitting easy and proper closing of the cover panel.

14 Claims, 11 Drawing Sheets

PANEL MODULE FOR A COMPUTER ENCLOSURE, AND THE COMPUTER ENCLOSURE

CROSS-REFERENCE TO RELATED APPLICATION

This application claims priority of Taiwanese Application No. 097117838, filed on May 15, 2008.

BACKGROUND OF THE INVENTION

1. Field of the Invention

The invention relates to a panel module for a computer enclosure and to the computer enclosure, more particularly to a panel module having a cover panel that can be opened forwardly or closed rearwardly, and to a computer enclosure having the panel module assembled thereto.

2. Description of the Related Art

Figure 1:
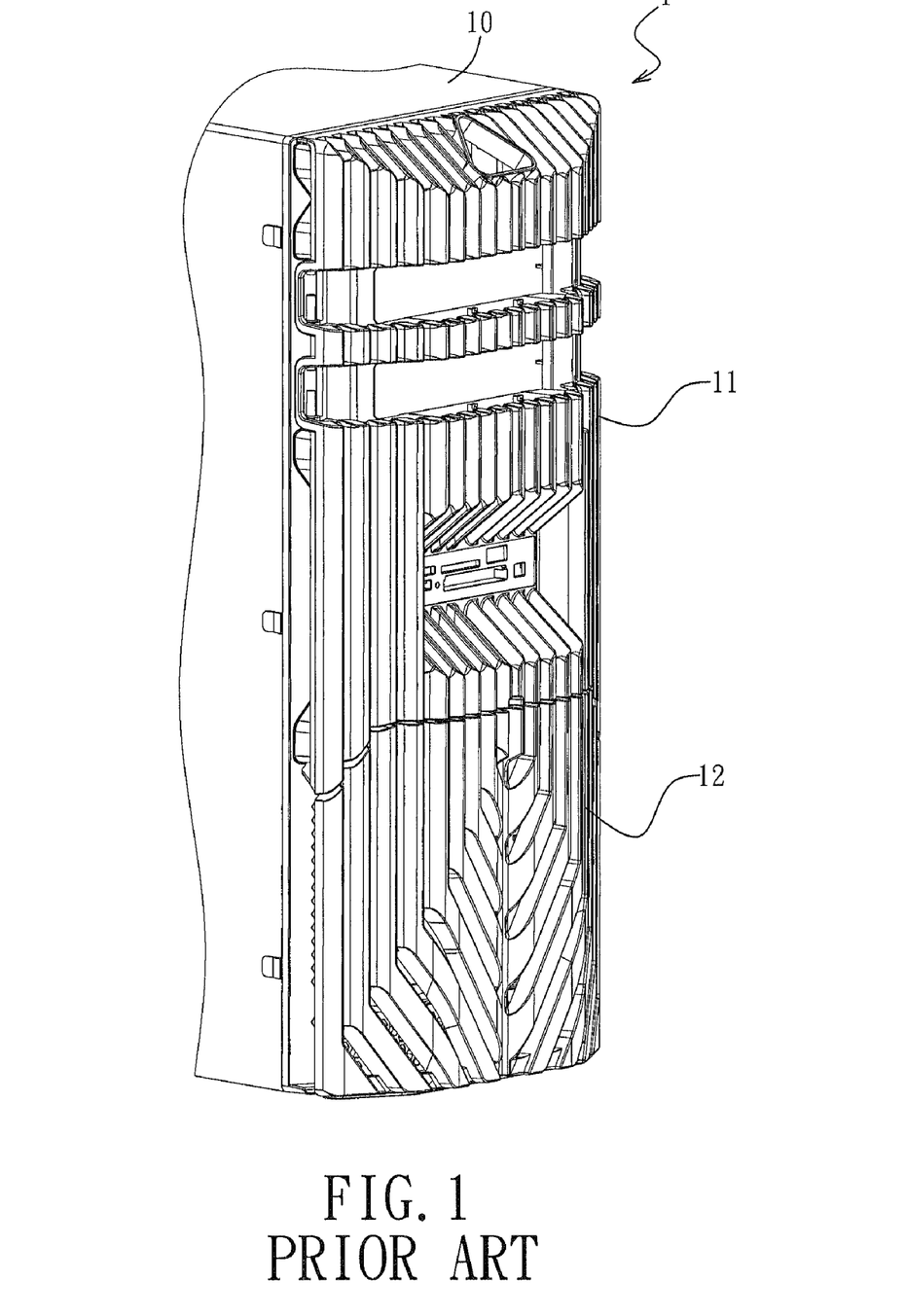
FIG. 1 is a perspective view of a conventional panel module for a computer enclosure.
Figure 2:
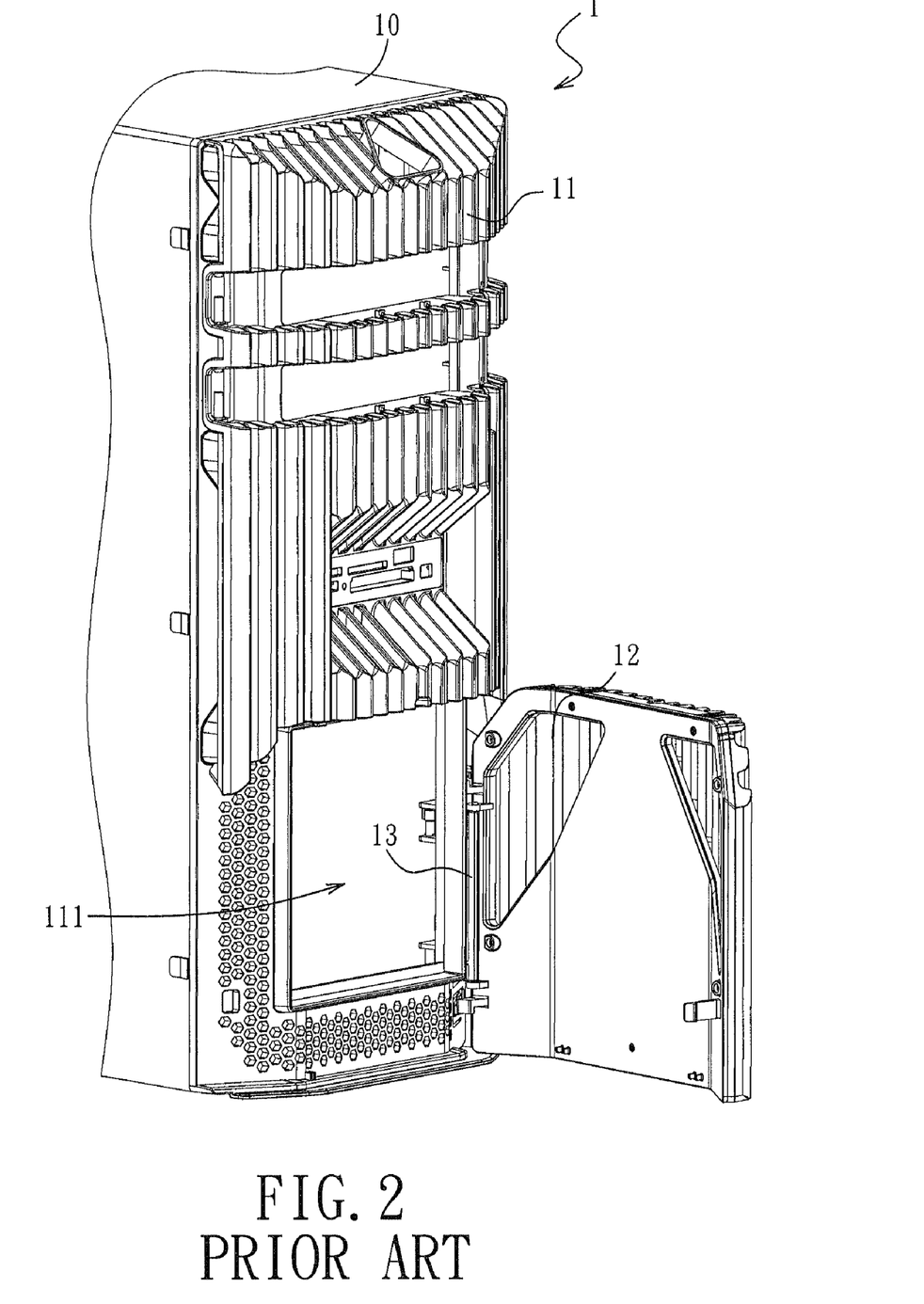
FIG. 2 is a perspective view of the conventional panel module with a cover panel that is opened forwardly.
Figure 3:
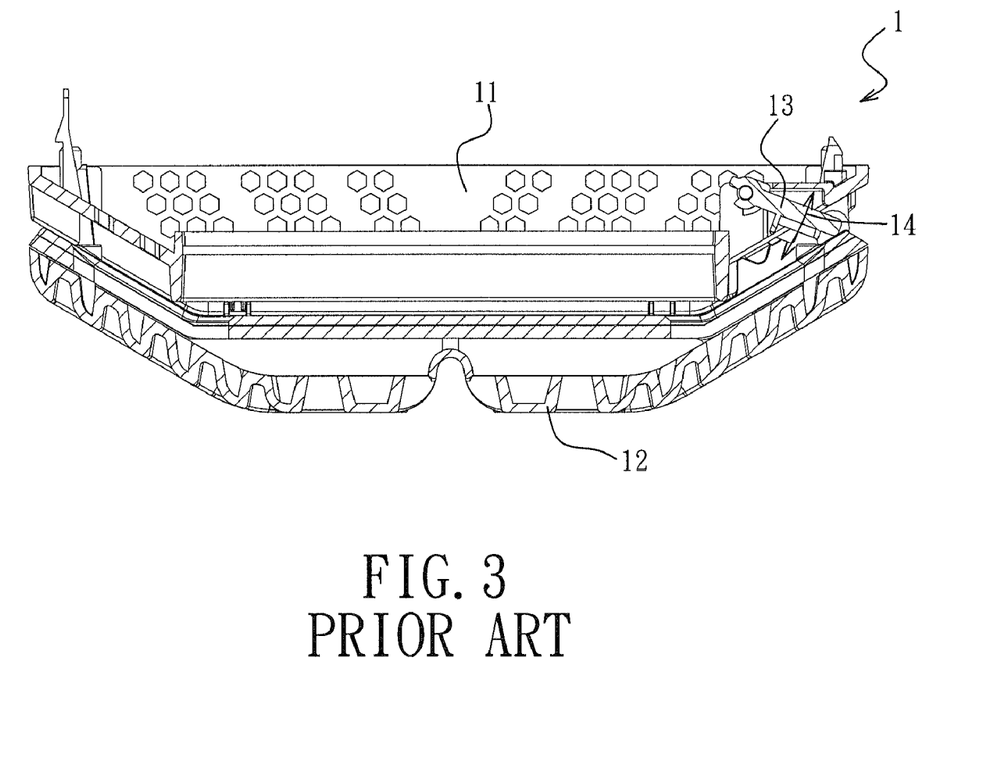
FIG. 3 is a sectional view of the conventional panel module.

Referring to FIGS. 1 to 3, a conventional panel module 1 for a computer enclosure includes a main panel 11, a cover panel 12, and a linkage member 13. The main panel 11 is disposed to be assembled to a front side of a case body 10 and has an opening region 111. The cover panel 12 is connected pivotally to one side of the opening region 111 of the main panel 11 through the linkage member 13 so as to be openable relative to the main panel 11 to permit access to the opening region 111 or to be closable relative to the main panel 11 to conceal the opening region 111.

When the panel module 1 is assembled to the front side of the case body 10, electronic components (not shown) within the case body 10 are accessible through the opening region 111 of the main panel 11. Thus, when a user intends to remove or install an electronic component from or in the case body 10, the cover panel 12 is opened and the electronic component is removed forwardly from the case body 10 or pushed rearwardly into the case body 10 through the opening region 111, without the need to detach the panel module 1.

However, there are some drawbacks associated with the conventional panel module 1. Since the cover panel 12 is connected pivotally to the main panel 11 through the linkage member 13, when the cover panel 12 moves relative to the main panel 11, the linkage member 13 also swings pivotally relative to the main panel 11 along directions indicated by the arrow 14 in FIG. 3. In practice, it is only when the linkage member 13 is rotated to a closed position as shown in FIG. 3 that the cover panel 12 can be properly closed upon the main panel 11, as shown in FIG. 1. Therefore, when the user wants to turn the cover panel 12 for closing upon the main panel 11, it is often necessary to adjust the linkage member 13 to the closed position in order to enable the cover panel 12 to be properly closed upon the main panel 11, which is relatively inconvenient.

SUMMARY OF THE INVENTION

Therefore, an object of the present invention is to provide a panel module for a computer enclosure, which has a cover panel that can be closed with relative ease and that is relatively convenient to use, and the computer enclosure.

Accordingly, the panel module of the present invention includes a main panel, a linkage member, a cover panel, and a resilient limiting member.

The main panel has a cover region and an opening provided in the cover region. The linkage member is connected pivotally to the main panel and the cover panel to enable the cover panel to be movable relative to the main panel to be closed upon or flipped away from the cover region. The linkage member is disposed at a closed position when the cover panel is closed upon the cover region of the main panel. The resilient limiting member is provided between the main panel and the linkage member. The resilient limiting member is disposed to limit the linkage member to the closed position. When the linkage member is turned pivotally relative to the main panel, the resilient limiting member stores a restoring force for restoring the linkage member to the closed position.

According to a preferred embodiment of this invention, the linkage member has a first pivoting portion and a second pivoting portion provided pivotally at the cover region proximate to one side of the opening. The cover panel has an inner panel face. The second pivoting portion of the linkage member is provided pivotally on the inner panel face of the cover panel.

According to a preferred embodiment of this invention, the main panel further has a flange provided at the cover region, and the cover panel further has a hook portion projecting from the inner panel face. The hook portion contacts the flange and displaces along the flange when the cover panel is turned pivotally relative to the main panel.

According to a preferred embodiment of this invention, the first pivoting portion is a shaft, and the linkage member further has two spaced-apart extension plates projecting from the shaft. The second pivoting portion includes two C-shaped structures provided respectively at distal ends of the two extension plates. The main panel further has two pivot posts provided at the cover region. The C-shaped structures of the second pivoting portion are fitted respectively on the pivot posts.

According to a preferred embodiment of this invention, the linkage member further has a lug projecting from the shaft. The resilient limiting member is an extension spring having one end connected to the lug, and another end connected to the cover region of the main panel. The linkage member is extended relative to the cover panel, and the extension spring stores the restoring force when the cover panel is flipped away from the cover region of the main panel. The linkage member is pulled by the restoring force of the extension spring to be folded against the inner panel face of the cover panel when the cover panel is closed upon the cover region of the main panel.

According to a preferred embodiment of this invention, the main panel includes a base panel body and an outer panel body coupled to and concealing a front side of the base panel body. A part of the base panel body that is not concealed by the outer panel body forms the cover region. The outer panel body has a bottom edge located above the opening and having a generally inverted V-shape. The cover panel has a top edge with a profile that is complementary to that of the bottom edge.

The computer enclosure of this invention includes a case body and a panel module. The case body has a front side. The panel module is provided at the front side of the case body, and includes a main panel, a linkage member, a cover panel, and a resilient limiting member.

The main panel has a cover region and an opening provided in the cover region. The linkage member is connected pivotally to the main panel and the cover panel to enable the cover panel to be movable relative to the main panel to be closed upon or flipped away from the cover region. The linkage member is disposed at a closed position when the cover panel is closed upon the cover region of the main panel. The resilient limiting member is provided between the main panel and the linkage member. The resilient limiting member is disposed to limit the linkage member to the closed position. When the linkage member is turned pivotally relative to the main panel, the resilient limiting member stores a restoring force to restore the linkage member to the closed position.

With the arrangement of the resilient limiting member in this invention, the linkage member can be automatically restored when the cover panel is to be closed upon the main panel, which not only permits easy and proper closing of the cover panel upon the main panel, but also renders use of the entire panel module more convenient.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
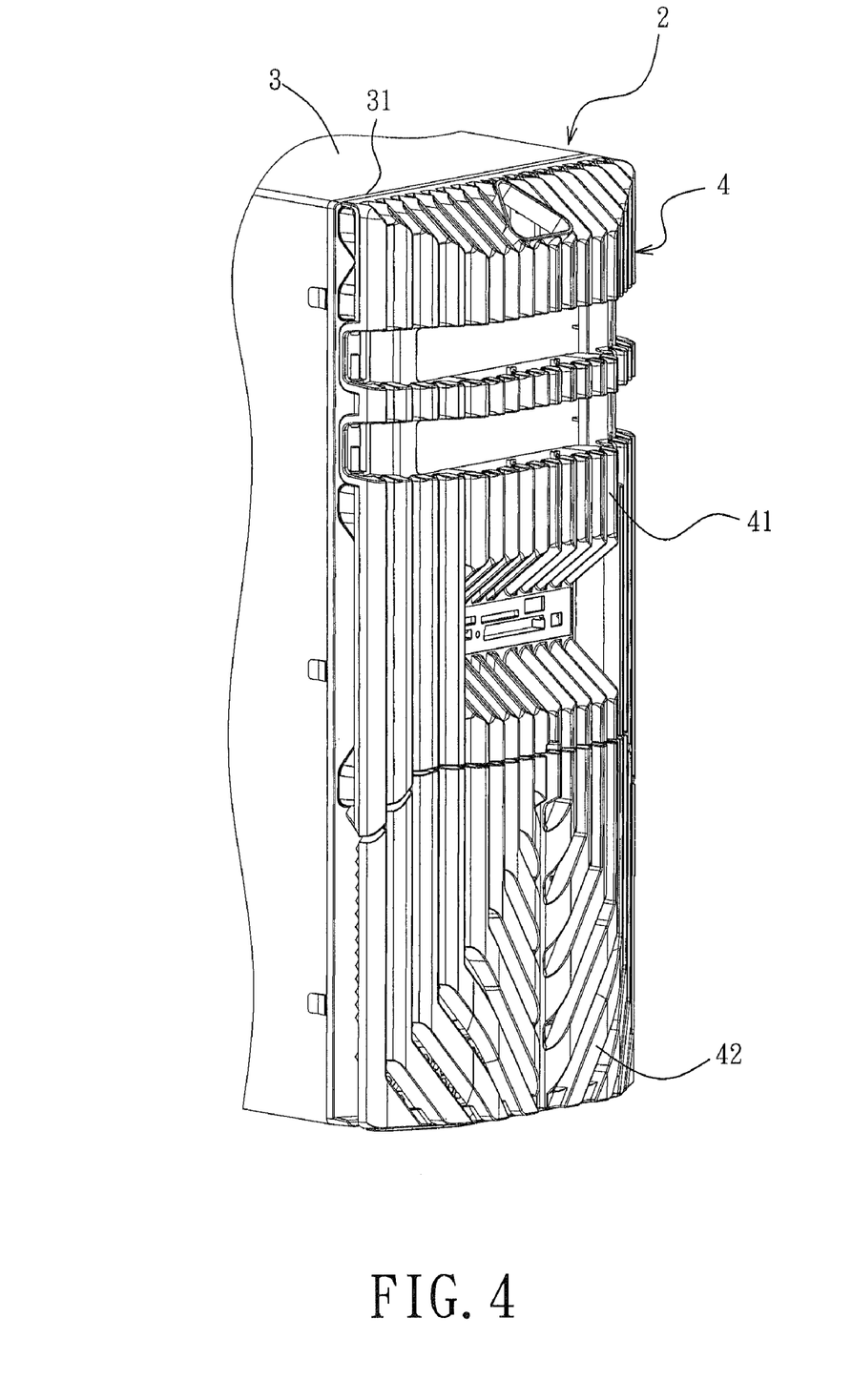
FIG. 4 is a perspective view of a preferred embodiment of a panel module for a computer enclosure according to the present invention when assembled to a case body.
Figure 5:
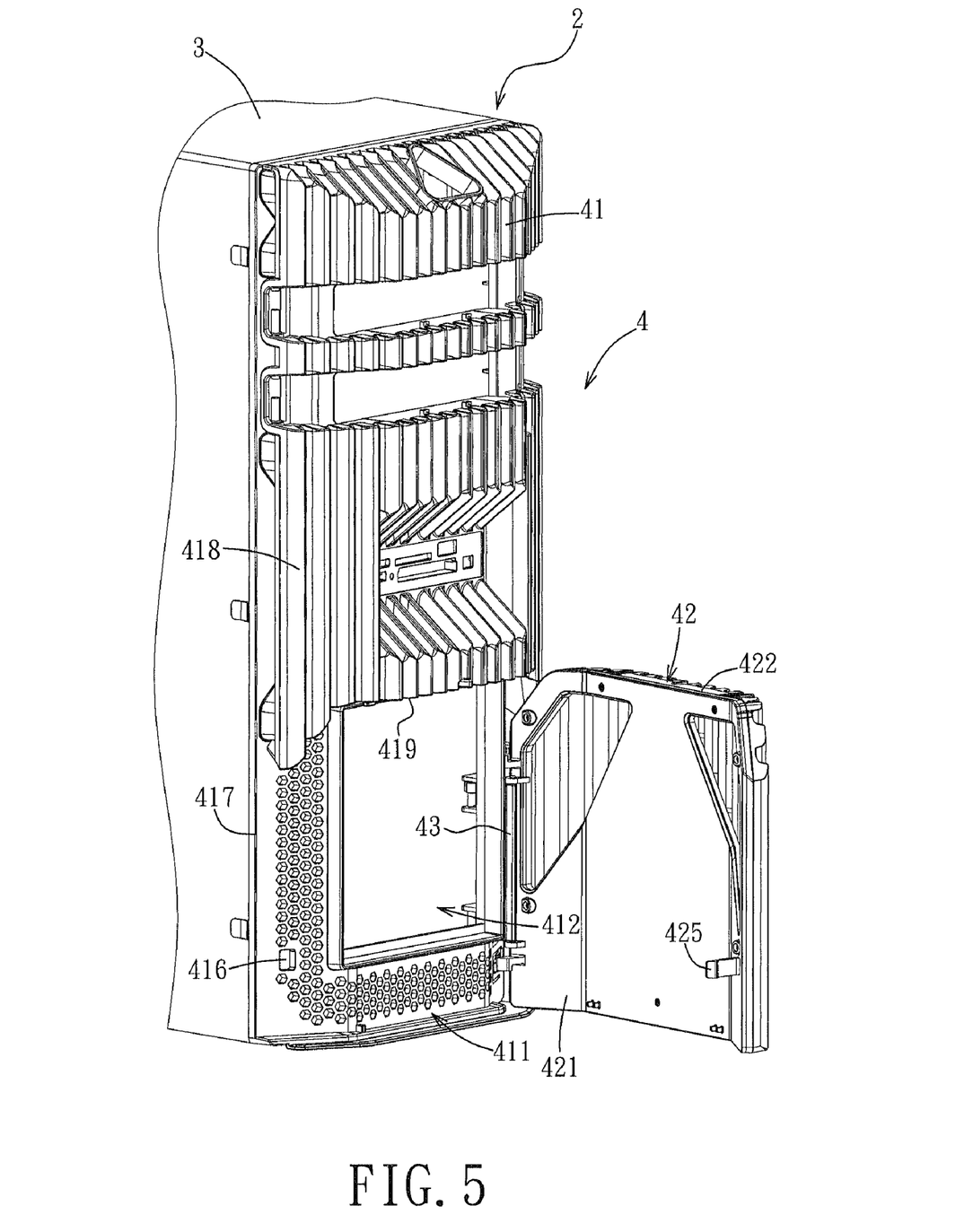
FIG. 5 is a perspective view of the preferred embodiment with a cover panel that is opened forwardly.

Referring to FIGS. 4 and 5, the preferred embodiment of a panel module 4 for a computer enclosure 2 according to the present invention is disposed to be assembled to a case body 3. The case body 3 is generally box-shaped and has a front side 31. The panel module 4 is assembled to the front side 31 of the case body 3 to form the computer enclosure 2.

Figure 6:
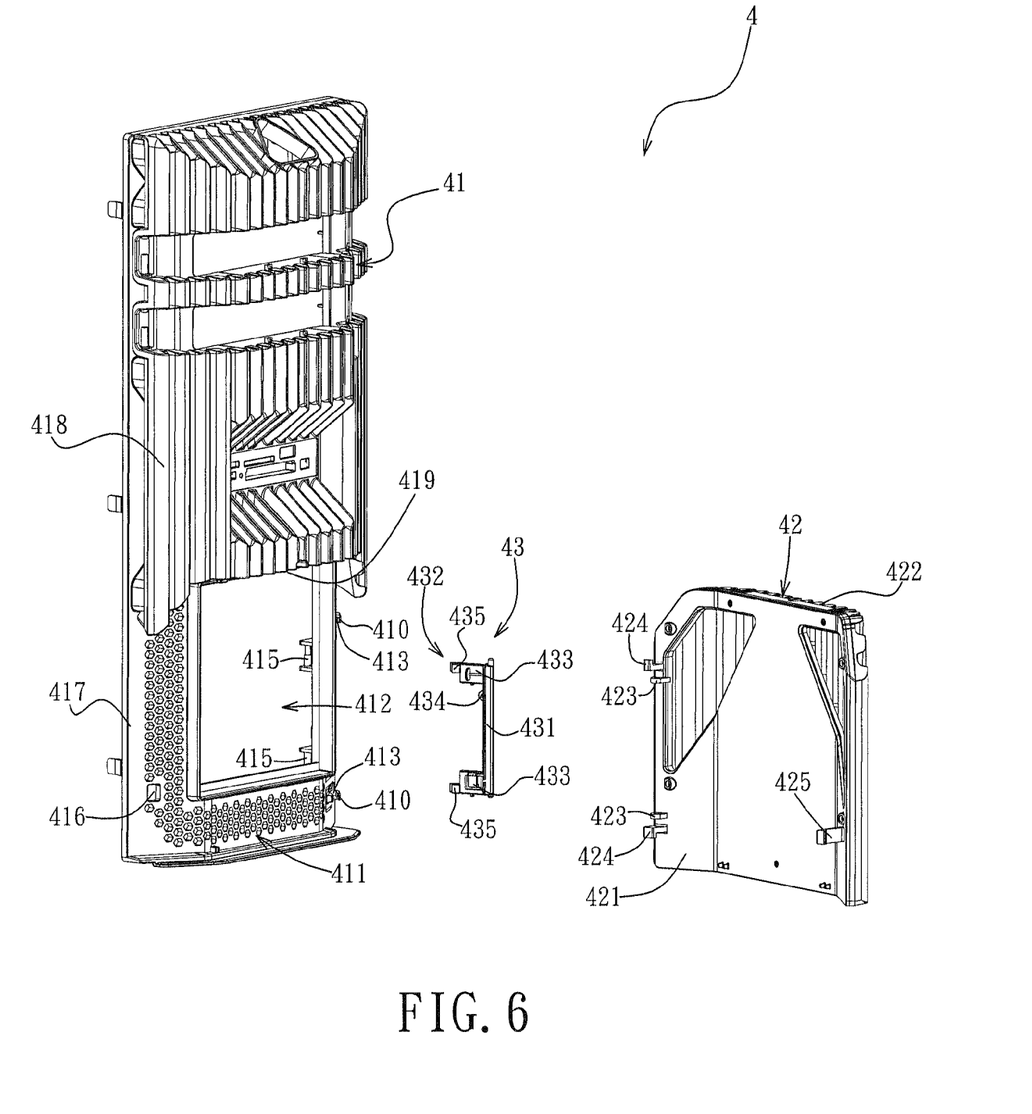
FIG. 6 is an exploded perspective view of the preferred embodiment.
Figure 7:
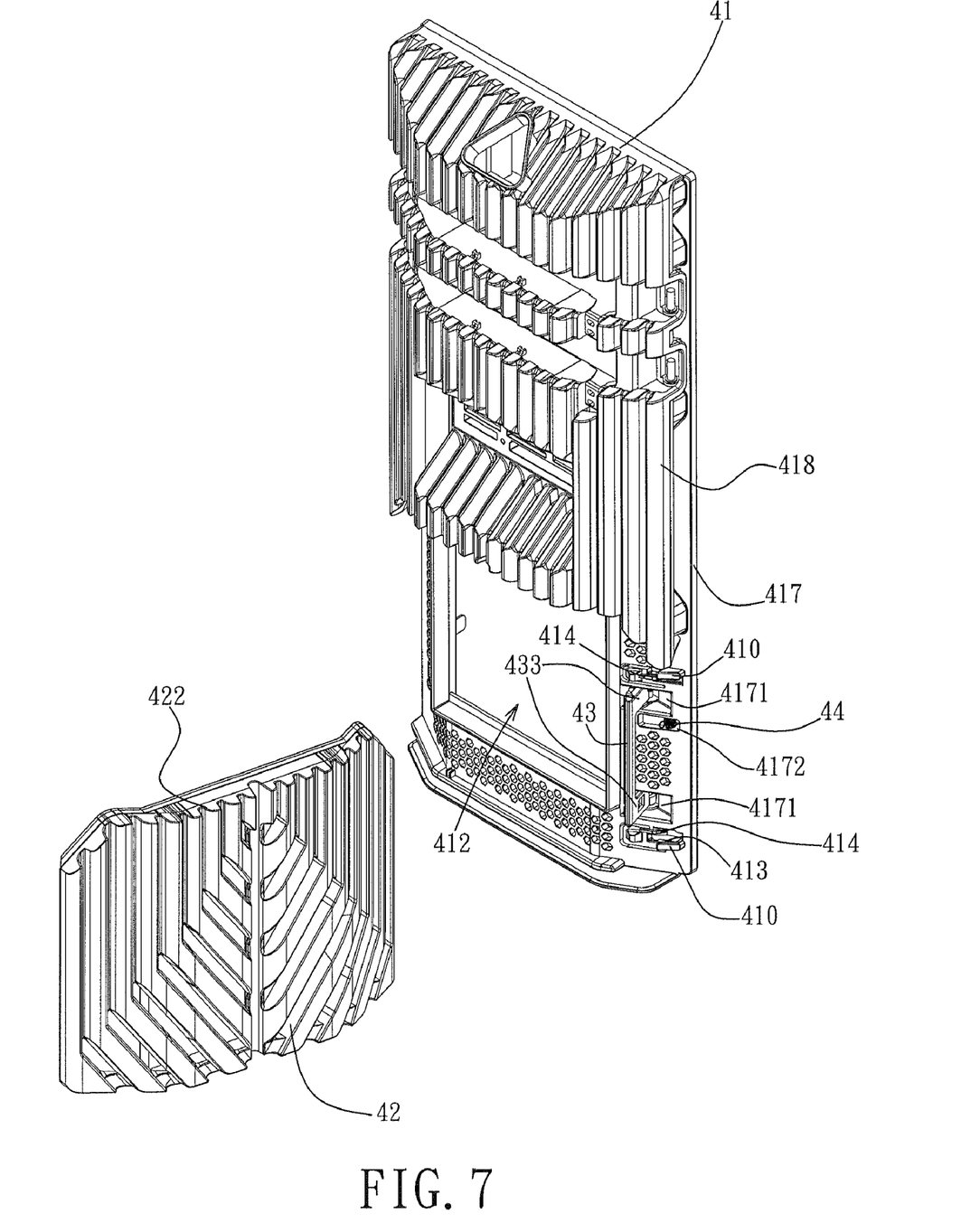
FIG. 7 is a perspective view of the preferred embodiment when viewed from another angle.
Figure 8:
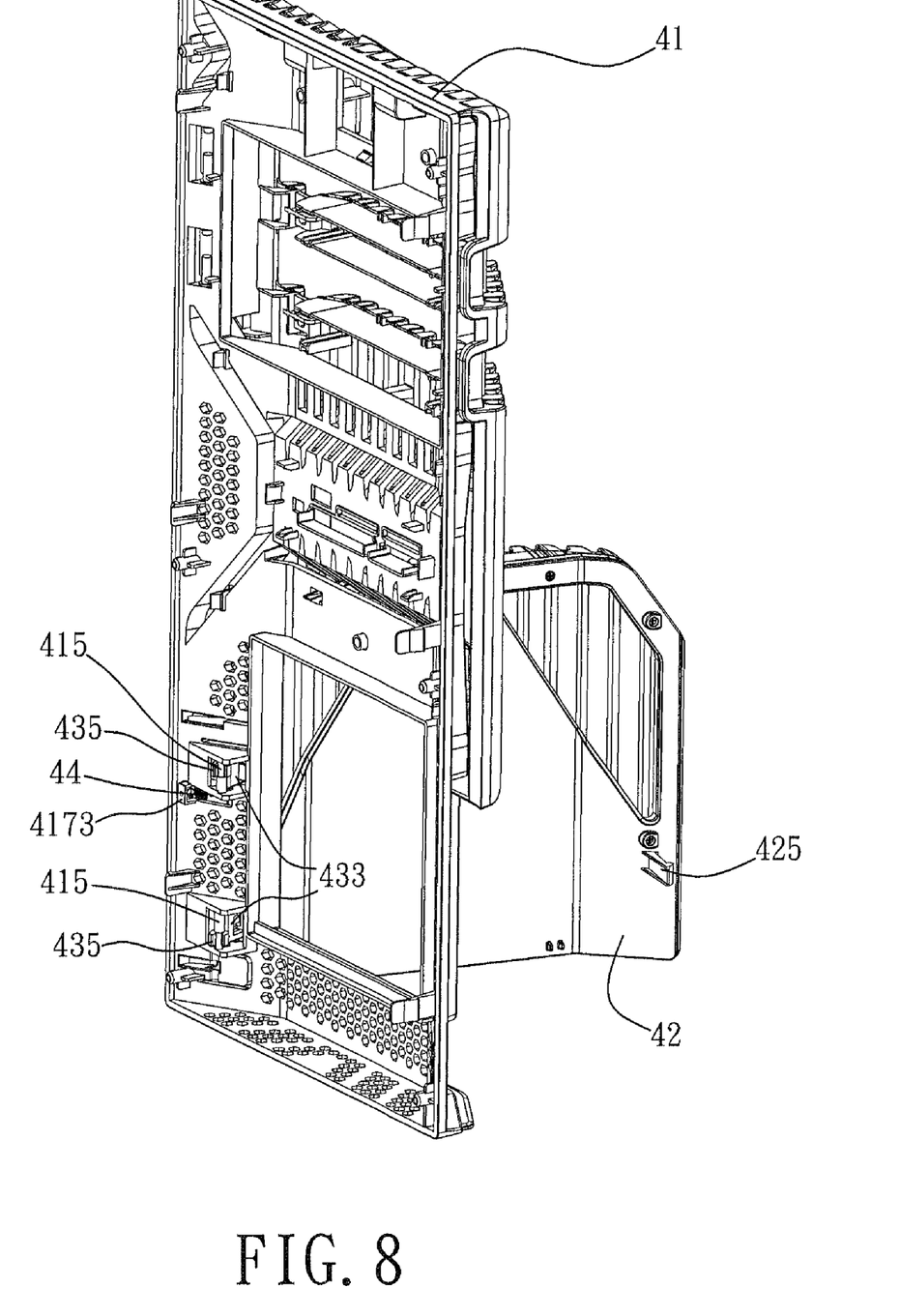
FIG. 8 is a perspective view of the preferred embodiment when viewed from yet another angle.

Referring to FIGS. 6, 7 and 8, the panel module 4 includes a main panel 41, a cover panel 42, a linkage member 43, and a resilient limiting member 44 (see FIG. 7). The main panel 41 has a cover region 411, an opening 412 provided in the cover region 411, two receiving grooves 413, two flanges 414, two pivot posts 415, and a retaining hole 416. The receiving grooves 413, the flanges 414, and the pivot posts 415 are proximate to one side of the opening 412, whereas the retaining hole 416 is proximate to the other side of the opening 412.

In practice, the main panel 41 of the preferred embodiment includes a base panel body 417 and an outer panel body 418 coupled to and concealing a front side of the base panel body 417. Part of a lower half portion of the base panel body 417 is not concealed by the outer panel body 418 to thereby form the cover region 411. Moreover, the outer panel body 418 has a generally inverted V-shaped bottom edge 419 that is located above the opening 412.

The opening 412, the receiving grooves 413, the flanges 414, the pivot posts 415, and the retaining hole 416 are provided in or on the base panel body 417. The two receiving grooves 413 are spaced apart from each other with one on top of the other. In this embodiment, each receiving groove 413 is defined by a hook-like structure 410 that projects from the base panel body 417. The two flanges 414 are respectively proximate to the receiving grooves 413. Each flange 414 is generally interposed between the receiving groove 413 that is proximate thereto and the opening 412, and extends transversely. In this embodiment, the base panel body 417 is recessed relatively deeply to form two first cavities 4171, and a second cavity 4172 interposed between the two first cavities 4171. The first and second cavities 4171, 4172 are on the same side of the opening 412 as the receiving grooves 413, the flanges 414, and the pivot posts 415. The two pivot posts 415 are generally upright and are located respectively in the two first cavities 4171 to be interposed between the two receiving grooves 413 and to be spaced apart from each other with one on top of the other.

The linkage member 43 includes a first pivoting portion 431, a second pivoting portion 432, two extension plates 433, and a lug 434. In this embodiment, the first pivoting portion 431 is a shaft. The two extension plates 433 extend respectively and laterally in the same direction from two ends of the shaft and are spaced apart from each other. The second pivoting portion 432 includes two C-shaped structures 435 that are respectively provided at distal ends of the two extension plates 433. The linkage member 43 is connected pivotally to the base panel body 417 through the two extension plates 433 that extend respectively into the two first cavities 4171 in the base panel body 417 and through the two C-shaped structures 435 that are respectively fitted on the two pivot posts 415. The linkage member 43 can thus pivot and swing relative to the base panel body 417.

The cover panel 42 has an inner panel face 421, a top edge 422 having a generally inverted V-shape and a profile that is complementary to that of the bottom edge 419 of the outer panel body 418, and two pivot lugs 423, two hook portions 424, and a catch member 425 projecting from the inner panel face 421. The two hook portions 424 are spaced apart from each other with one on top of the other. The two pivot lugs 423 are also spaced apart from each other with one on top of the other, and are interposed between the two hook portions 424. The two pivot lugs 423 are disposed for pivotal connection with two ends of the first pivoting portion 431 of the linkage member 43 to enable the cover panel 42 to be connected pivotally to the main panel 41 through the linkage member 43 so as to be movable relative to the main panel 41. The two hook portions 424 correspond respectively in position to the upper and lower sets of the flanges 414 and the receiving grooves 413. The catch member 425 corresponds in position to the retaining hole 416 in the main panel 41.

The resilient limiting member 44 is provided between the main panel 41 and the linkage member 43 to limit the linkage member 43 to a closed position, and is resiliently pivotable and swingable relative to the main panel 41. The resilient limiting member 44 used in this embodiment is an extension spring accommodated in the second cavity 4172 in the base panel body 417, and has one end connected and secured to an inner wall 4173 (see FIG. 8) of the second cavity 4172, and another end connected and secured to the lug 434 of the linkage member 43.

Referring back to FIGS. 4 and 5, when the panel module 4 is assembled to the front side 31 of the case body 3, the opening 412 in the main panel 41 permits forward removal from or rearward insertion into the case body 3 of an electronic component (such as a hard disk, not shown), and the cover panel 42 is openable forwardly relative to the main panel 41 to expose the opening 412 or is closable rearwardly upon the cover region 411 to conceal the opening 412.

Figure 9:
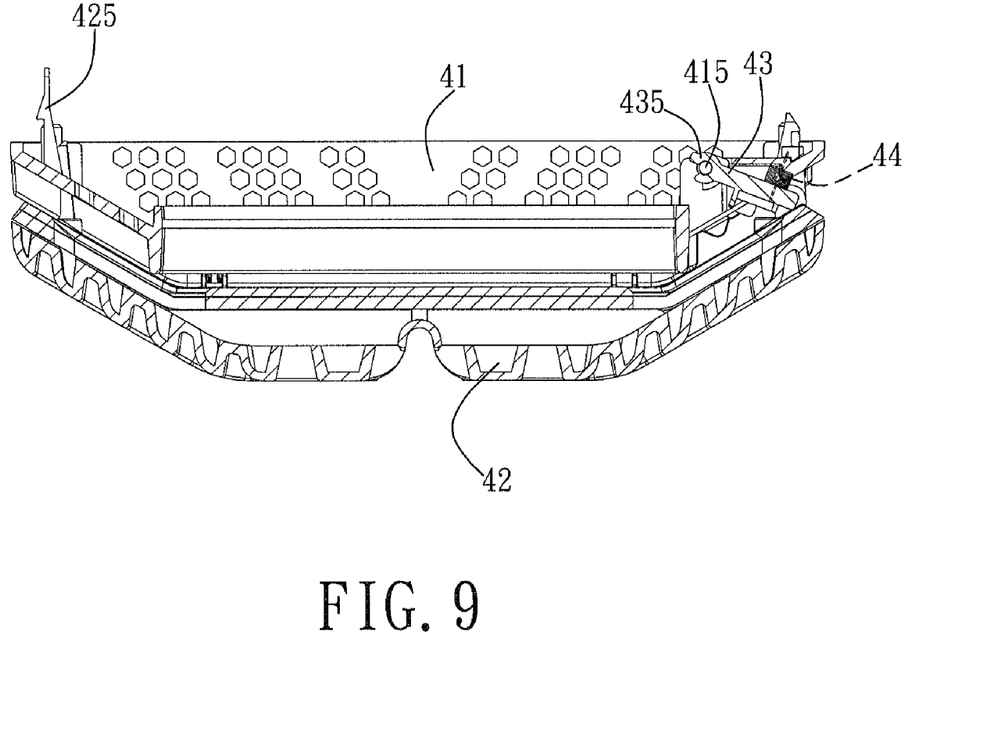
FIG. 9 is a sectional view of the preferred embodiment with the cover panel closed.

Referring to FIGS. 4, 5, and 9, when the cover panel 42 is closed upon the cover region 411 of the main panel 41, the cover panel 42 will fit in the cover region 411 of the main panel 41, with the catch member 425 of the cover panel 42 engaging the retaining hole 416 in the main panel 41, and with the top edge 422 of the cover panel 42 and the bottom edge 419 of the outer panel body 418 being complementary to each other, to cooperatively constitute a facade of the entire panel module 4. At this time, the linkage member 43 is disposed at the closed position. The closed position herein refers to the position where the linkage member 43 is folded against the inner panel face 421 of the cover panel 42 and is interposed between the main panel 41 and the cover panel 42 when the cover panel 42 is closed upon the main panel 41.

Figure 10:
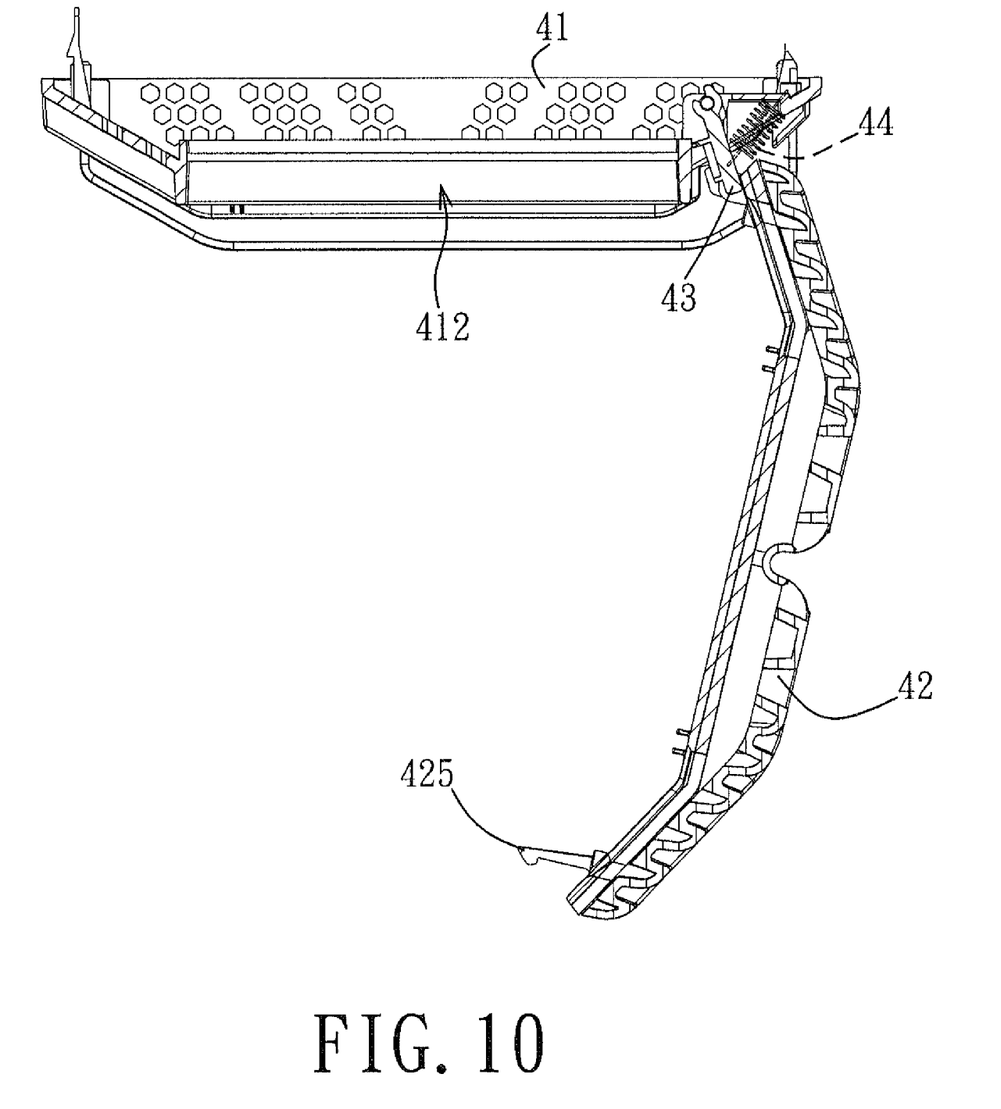
FIG. 10 is a sectional view of the preferred embodiment with the cover panel opened.

Referring to FIGS. 5 and 10, when it is desired to open the cover panel 42 relative to the main panel 41, since the bottom edge 419 of the outer panel body 418 has two sides extending downwardly, the linkage member 43 must be pivoted forwardly in association with the cover panel 42 relative to the main panel 41 in order for the cover panel 42 to open forwardly relative to the main panel 41 without being obstructed by the two protruding sides of the bottom edge 419 of the outer panel body 418. Therefore, when the cover panel 42 is opened forwardly relative to the main panel 41, the linkage member 43 is moved in association with the cover panel 42 to pivot forwardly relative to the main panel 41, and is extended relative to the cover panel 42. At this time, the resilient limiting member 44 is stretched and stores a restoring force for enabling the linkage member 43 to return to the closed position.

When the user wants to have the cover panel 42 close upon the main panel 41 once again, due to the restoring action of the resilient limiting member 44, during the process of rearward pivotal turning of the cover panel 42 toward the main panel 41, the restoring force stored in the resilient limiting member 44 will enable the linkage member 43 to be automatically pulled back to the closed position (the position of the linkage member 43 in FIG. 9), without requiring the user to pre-adjust the linkage member 43 to the closed position where the linkage member 43 is folded against the inner panel face 421 of the cover panel 42 before the cover panel 42 can be closed upon the main panel 41.

In brief, the present invention utilizes the restoring force generated by the resilient limiting member 44 to enable the linkage member 43 to be pulled and restored to the position where it is folded against the inner panel face 421 of the cover panel 42 during the process of rearward pivotal turning of the cover panel 42 to close upon the main panel 41 by the user.

Figure 11:
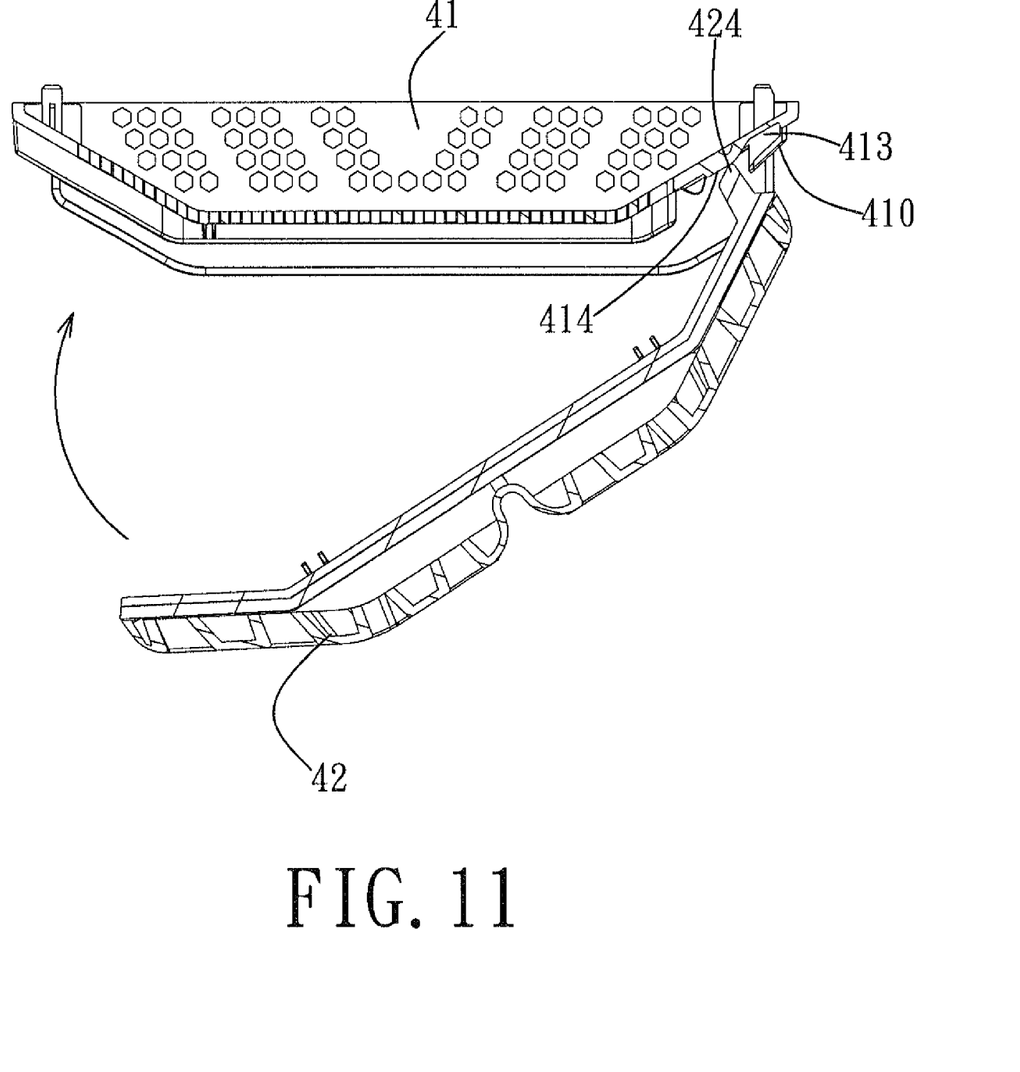
FIG. 11 is a sectional view of the preferred embodiment to illustrate a hook portion in sliding contact with a flange.

Referring to FIGS. 6 and 11, it is additionally noted that, when the cover panel 42 is in the process of being turned pivotally to close upon the cover region 411, distal ends of the hook portions 424 at the inner panel face 421 of the cover panel 42 will slide along and contact the flanges 414, respectively. This helps to make turning of the cover panel 42 relative to the main panel 41 steadier, so that it is less likely to result in movements other than pivotal turning. When the cover panel 42 is closed upon the cover region 411, the hook portions 424 will move respectively into the receiving grooves 413 and be limited therein by the hook-like structures 410 forming the receiving grooves 413.

In this embodiment, although the resilient limiting member 44 is connected to the lug 434 of the linkage member 43, the resilient limiting member 44 may be connected to other parts of the linkage member 43 in other embodiments of this invention, as long as the position of connection of the resilient limiting member 44 is at a certain distance from the pivotal connection between the linkage member 43 and the main panel 41 so as to facilitate pivotal turning of the linkage member 43 when the latter is subjected to the restoring force of the resilient limiting member 44.

As described hereinabove, with the provision of the resilient limiting member 44 in the present invention, when it is intended for the cover panel 42 to be closed upon the main panel 41, the linkage member 43 will be automatically restored, thereby sparing the user the trouble of having to pre-adjust the linkage member 43 before the cover panel 42 can be closed upon the main panel 41. This not only enables the cover panel 42 to be easily and properly closed upon the main panel 41, use of the entire panel module 4 is also relatively convenient.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A panel module for a computer enclosure, comprising:
a main panel having a cover region and an opening provided in said cover region;
a linkage member having a first pivoting portion and a second pivoting portion provided pivotally at said cover region proximate to one lateral boundary of said opening;
a cover panel having an inner panel face, said second pivoting portion of said linkage member being provided pivotally on said inner panel face of said cover panel, said cover panel being movable relative to said main panel so as to cover said cover region and to be flipped away from said cover region, said linkage member being disposed at a closed position when said cover panel is closed upon said cover region of said main panel; and
a resilient limiting member provided between said main panel and said linkage member, said resilient limiting member being disposed to limit said linkage member to said closed position, said resilient limiting member storing a restoring force to enable said linkage member to be restored to the closed position when said linkage member is turned pivotally relative to said main panel,
wherein said main panel further has a flange provided at said cover region proximate to said one lateral boundary of said opening, and said cover panel further has a hook portion projecting from said inner panel face, said hook portion contacting said flange and displacing along said flange when said cover panel is turned pivotally relative to said main panel.

2. The panel module for a computer enclosure according to claim 1, wherein said main panel further has a receiving groove formed in said cover region, said hook portion being received in said receiving groove when said cover panel is closed upon said cover region.

3. The panel module for a computer enclosure according to claim 1, wherein said first pivoting portion is a shaft, and said linkage member further has two spaced-apart extension plates projecting from said shaft, said second pivoting portion including two C-shaped structures provided respectively at distal ends of said two extension plates, said main panel further having two pivot posts provided at said cover region, said C-shaped structures of said second pivoting portion being fitted respectively on said pivot posts.

4. The panel module for a computer enclosure according to claim 3, wherein said linkage member further has a lug projecting from said shaft, said resilient limiting member being an extension spring having one end connected to said lug, and another end connected to said cover region of said main panel, said linkage member being extended relative to said cover panel and said extension spring storing the restoring force when said cover panel is flipped away from said cover region of said main panel, said linkage member being pulled by the restoring force of said extension spring to be folded against said inner panel face of said cover panel when said cover panel is closed upon said cover region of said main panel.

5. The panel module for a computer enclosure according to claim 4, wherein said cover panel further has two pivot lugs projecting from said inner panel face, said shaft having two ends respectively pivoted to said pivot lugs.

6. The panel module for a computer enclosure according to claim 5, wherein said main panel further has a retaining hole provided in said cover region, said cover panel further having a catch member provided on said inner panel face, said catch member engaging said retaining hole when said cover panel is closed upon said cover region.

7. The panel module for a computer enclosure according to claim 6, wherein said main panel includes a base panel body and an outer panel body coupled to and concealing a front side of said base panel body, a part of said base panel body that is not concealed by said outer panel body forming said cover region, said outer panel body having a bottom edge located above said opening and having a generally inverted V-shape, said cover panel having a top edge with a profile that is complementary to that of said bottom edge.

8. A computer enclosure comprising:
a case body having a front side;
a panel module provided at said front side of said case body and including:
a main panel having a cover region and an opening provided in said cover region;
a linkage member having a first pivoting portion and a second pivoting portion provided pivotally at said cover region proximate to one lateral boundary of said opening;
a cover panel having an inner panel face, said second pivoting portion of said linkage member being provided pivotally on said inner panel face of said cover panel, said cover panel being movable relative to said main panel so as to cover said cover region and to be flipped away from said cover region, said linkage member being disposed at a closed position when said cover panel is closed upon said cover region of said main panel; and
a resilient limiting member provided between said main panel and said linkage member, said resilient limiting member being disposed to limit said linkage member to said closed position, said resilient limiting member storing a restoring force to enable said linkage member to be restored to the closed position when said linkage member is turned pivotally relative to said main panel,
wherein said main panel further has a flange provided at said cover region proximate to said one lateral boundary of said opening, and said cover panel further has a hook portion projecting from said inner panel face, said hook portion contacting said flange and displacing along said flange when said cover panel is turned pivotally relative to said main panel.

9. The computer enclosure according to claim 8, wherein said main panel further has a receiving groove formed in said cover region, said hook portion being received in said receiving groove when said cover panel is closed upon said cover region.

10. The computer enclosure according to claim 8, wherein said first pivoting portion is a shaft, and said linkage member further has two spaced-apart extension plates projecting from said shaft, said second pivoting portion including two C-shaped structures provided respectively at distal ends of said two extension plates, said main panel further having two pivot posts provided at said cover region, said C-shaped structures of said second pivoting portion being fitted respectively on said pivot posts.

11. The computer enclosure according to claim 10, wherein said linkage member further has a lug projecting from said shaft, said resilient limiting member being an extension spring having one end connected to said lug, and another end connected to said cover region of said main panel, said linkage member being extended relative to said cover panel and said extension spring storing the restoring force when said cover panel is flipped away from said cover region of said main panel, said linkage member being pulled by the restoring force of said extension spring to be folded against said inner panel face of said cover panel when said cover panel is closed upon said cover region of said main panel.

12. The computer enclosure according to claim 11, wherein said cover panel further has two pivot lugs projecting from said inner panel face, said shaft having two ends respectively pivoted to said pivot lugs.

13. The computer enclosure for a computer enclosure according to claim 12, wherein said main panel further has a retaining hole provided in said cover region, said cover panel further having a catch member provided on said inner panel face, said catch member engaging said retaining hole when said cover panel is closed upon said cover region.

14. The computer enclosure according to claim 13, wherein said main panel includes a base panel body and an outer panel body coupled to and concealing a front side of said base panel body, a part of said base panel body that is not concealed by said outer panel body forming said cover region, said outer panel body having a bottom edge located above said opening and having a generally inverted V-shape, said cover panel having a top edge with a profile that is complementary to that of said bottom edge.

* * * * *